Jan. 31, 1961 D. W. DODGE 2,970,277

BRIDGE BIASING TRANSISTOR CIRCUIT

Filed Oct. 7, 1957

INVENTOR.
David W. Dodge
BY R. E. Fowler
ATTORNEY

United States Patent Office 2,970,277
Patented Jan. 31, 1961

2,970,277

BRIDGE BIASING TRANSISTOR CIRCUIT

David W. Dodge, Kokomo, Ind., assignor to General Motors Corporation, Detroit, Mich., a corporation of Delaware Filed Oct. 7, 1957, Ser. No. 688,461

2 Claims. (Cl. 330—40)

This invention relates to electronic amplifying means and more particularly to a transistor amplifying stage useful in the audio frequency section of a radio receiver.

In order to accommodate parts having a limited power capacity in combination with a transistor amplifier, the present circuit was designed to reduce the bias current flowing through a particular component to a minimum so that it would not reach the saturation point.

In some apparatus where more than one type of operation is obtained and parts serve a dual function, the part must be selected for optimum cost, size, and function for one type of operation which may make the part not so satisfactory for a different phase of operation but still within a useable range. As an example of this multiple function or operation, reference may be made to a combination automobile and portable radio receiver in which only a small speaker is driven by a final audio stage and transformer when the set is operated as a portable. The transformer may then be of a modest size and weight and relatively small current carrying capacity for this use. However, when the portable section is plugged into and switched to remaining equipment permanently mounted on the automobile, and additional amplifier stage is switched in together with a large speaker, the transformer in the portable section acts as an interstage transformer and is called upon to carry direct current. It might therefore become saturated in this latter type operation if means were not provided to reduce some of the currents flowing in the transformer due to biasing means.

It is therefore an object in making this invention to provide an amplifier input transformer circuit through which a minimum of biasing current flows.

It is a still further object in making this invention to provide a bridge type input circuit for a transistor amplifier stage to reduce the amount of bias current flowing.

Figure 1:
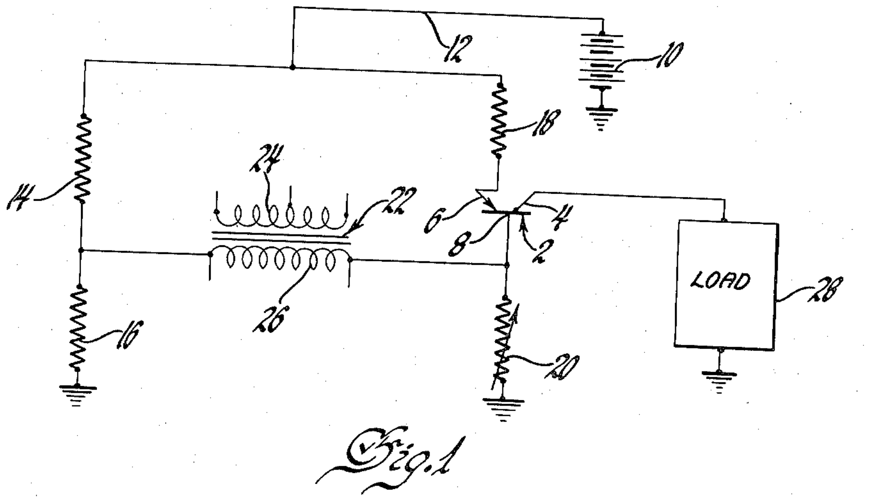
Figure 2:
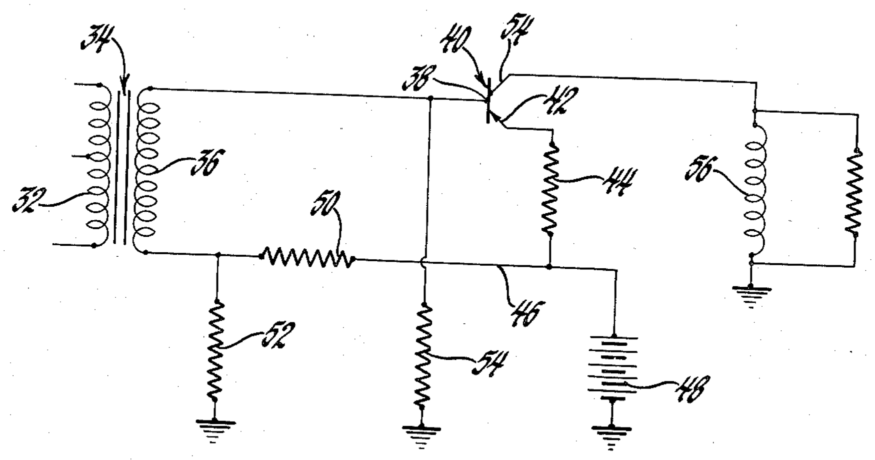

With these and other objects in view, my invention will be best understood by reference to the following specification and the claims and the illustrations in the accompanying drawings in which:

Figure 1 is a circuit diagram of a transistor amplifier stage embodying my invention, and Figure 2 is a circuit diagram of a modified form of circuit embodying my invention.

Referring now more particularly to Figure 1, there is shown therein a final audio amplifier stage such as might be permanently mounted in a car including a transistor 2 having a collector electrode 4, an emitter electrode 6 and a base electrode 8. A source of electrical power is illustrated as a battery 10. One terminal of battery 10 is connected to ground and the opposite terminal through line 12 to the top of a bridge input circuit. The bridge consists of a resistor 14 connected in series with a second resistor 16 which form one side, a third resistor 18 which is directly connected to the emitter electrode 6 of the transistor 2 which together with the path through the transistor form one leg of the opposite side and, lastly, a variable resistor 20 which is connected to the base 8 of the transistor 2. As before mentioned, the power lead 12 is connected to a point common to the two resistances 14 and 18. The remote terminals of the two resistors 16 and 20 are connected to ground. The signal input to the transistor amplifier is connected across the bridge and includes an input transformer 22 having a primary winding 24 to which signals are applied. The secondary winding 26 is connected across from a point between resistors 14 and 16 which form the left-hand side of the bridge and the base electrode 8 of the transistor 2. The output of the transistor amplifier is shown diagrammatically as any suitable load such as 28 which may be the permanent speaker of the car. The collector current is set by adjusting resistor 20.

In order to provide the necessary bias for the emitter and base of the transistor 2, the right-hand side of the bridge in Fig. 1 acts as a voltage divider, since resistance 18, emitter 6, base 8 and resistor 20 are connected directly in series between the power source 10 and ground. It is further desired to point out that any current flowing between the emitter and base through the transistor 2 due to such biasing only flows in the circuit previously described and not through the transformer secondary winding 26 of the input transformer 22. Once set, the bridge is near balance for commercial transistors within a tolerated range of characteristics. As explained previously, in certain instances where a component serves under different sets of load conditions, it can only properly be designed for one set of conditions but must be able to function satisfactorily under other conditions. In the current instance, it is assumed that the transformer 22 is selected for operation at low power portable operation. However, when it is combined with an extra stage amplifier which is permanently fixed in the car such as shown here, precautionary steps must be taken to hold down the current through the transformer so that the low power transformer will not saturate on heavier duty. By using this circuit shown in Figure 1, any biasing current flowing through the transistor 2 to provide the proper biasing voltage for the electrodes does not flow through the transformer winding 22 and therefore does not produce extra current which would tend to increase the saturation. On the other hand, the signals which it is desired to amplify may be injected into this bridge circuit and will apply a signal voltage to the emitter-base section which will be amplified in the output and appear as amplified operating signals across the load 28.

Figure 2 is similar to Figure 1 but shows a more commercial form of my invention and that which might be incorporated into a production set. In that instance the signal from the preceding audio amplifier stage is applied to the primary winding 32 of the coupling transformer 34. The secondary winding 36 of this transformer has one terminal connected directly to the base electrode 38 of the amplifying transistor 40. The emitter electrode 42 of the transistor is directly connected through resistor 44 to line 46. Line 46 extends from one terminal of the power source indicated herein as battery 48 to one terminal of a resistance 50. The remaining terminal of resistance 50 is connected to the opposite side of the secondary winding 32. This point is likewise connected to ground through resistance 52. Completing the input bridge circuit is a resistance 54 which is connected between base 38 and ground.

The input bridge circuit therefore consists of resistance 44 and transistor 40 which form one leg together with resistance 54 completing one-half of the bridge. The other side of the bridge includes resistance 50 in series with resistance 52. As in Figure 1, secondary winding 32 is connected directly across the bridge and power supply 48 provides voltage for the bridge. Thus, as in the previous instance, emitter-base bias current does not flow through the transformer winding 36 and therefore does not contribute to the saturation of said transformer. The output of the transistor 40 is connected to collector electrode 54 and may take the form of an output transformer winding 56 to feed the main speaker.

It is to be appreciated that my basic invention consists in the channeling of any bias current from flowing through certain components which may become overloaded when operated at a higher than rated load and therefore that the illustration of a combination portable and automobile radio receiver is only indicative of one use and that my invention has many broader applications.

I claim:

1. In amplifying means, a source of electrical power, first and second resistances connected in series across said source of power and forming one side of a bridge circuit, a transistor having a base, emitter and collector electrodes, a third resistance, said emitter and base electrodes and a fourth resistance being connected in series and across the source of electrical power in shunt to the first and second resistances and forming the other side of a bridge circuit and also supplying the required bias voltages to the transistor, the ratio of the impedance of the first resistance to the second resistance being approximately the same as the ratio of the impedance of the third resistance and the transistor between emitter and base electrodes to the impedance of the fourth resistor so that substantially no potential difference will be developed across the bridge circuits by currents flowing to develop required bias voltages for the transistor electrodes an input transformer connected across the bridge from the base of the transistor to a point intermediate the first and second resistances to apply incoming signals to the transistor and a load circuit connected to the collector electrode.

2. Amplifying means as defined by claim 1 wherein one of said resistances is variable.

References Cited in the file of this patent

UNITED STATES PATENTS

| | | |
|---|---|---|
| 2,694,113 | Meacham | Nov. 9, 1954 |
| 2,784,262 | Crow | Mar. 5, 1957 |
| 2,790,033 | Keiper | Apr. 23, 1957 |
| 2,831,114 | Overbeek | Apr. 15, 1958 |